United States Patent [19]

Ilmasti

[11] Patent Number: 4,786,804
[45] Date of Patent: Nov. 22, 1988

[54] MEANS FOR MEASURING RADON GAS IN THE SOIL

[75] Inventor: Veikko Ilmasti, Helsinki, Finland

[73] Assignee: Ilmasti Elektronikka Oy, Vantaa, Finland

[21] Appl. No.: 66,544

[22] Filed: Jun. 26, 1987

[30] Foreign Application Priority Data

Jun. 18, 1987 [FI] Finland .................................. 872717

[51] Int. Cl.4 ............................................. G01V 5/00
[52] U.S. Cl. ..................................... 250/253; 73/19; 250/255
[58] Field of Search ...................... 250/253, 255, 472.1; 73/19

[56] References Cited

U.S. PATENT DOCUMENTS

| | | | |
|---|---|---|---|
| 2,878,391 | 3/1959 | Campbell | 250/253 X |
| 3,922,555 | 11/1975 | Chapuis et al. | 250/472.1 |
| 3,968,371 | 7/1976 | Greendale | 250/255 X |
| 4,017,731 | 4/1977 | Howell et al. | 250/253 |
| 4,065,972 | 1/1978 | Holub et al. | |
| 4,262,203 | 4/1981 | Overhoff | |
| 4,468,558 | 8/1984 | Malmqvist et al. | 250/253 |
| 4,487,054 | 12/1984 | Zison | 73/19 |

FOREIGN PATENT DOCUMENTS 74551  10/1987  Finland .

Primary Examiner—John Chapman
Assistant Examiner—Joseph W. Roskos
Attorney, Agent, or Firm—Barnes & Thornburg

[57] ABSTRACT

A device for measuring radon gas in the soil, consisting of a continuous-acting radon meter operating on through-flow principle. The meter comprises an enclosed volume, the gas therein being measured with the radon meter.

11 Claims, 3 Drawing Sheets

MEANS FOR MEASURING RADON GAS IN THE SOIL

The present invention concerns a means for measuring radon gas in the soil, said means consisting of a continuous-acting radon meter operating on flow-through principle.

Before building a house on a given site, it is useful to make sure of the radon content in the soil. Considering the radon gas content, protective measures required in building a house are to be observed. Radon gas in the soil is nowadays measured either with alpha film boxes dug into the soil or by tubes inserted in the soil, with the aid of which a gas sample is drawn up to be measured in a laboratory. These operations are either time-consuming or unreliable.

The object of the present invention is to provide a measuring means of novel type, which is both rapid and yields extremely reliable measuring results. The measuring means of the invention is characterized in that said measuring means comprises an enclosed volume, the gas within which is measured with a radon meter. With the aid of the invention, the radon gas quantity in the soil is easy to find out very rapidly and reliably and, accordingly, to accomplish the required measures.

An advantageous embodiment of the invention is characterized in that the enclosed volume consists of a tent-like cupola intended to be transferred on the ground to several points where e.g. a house is going to be built. Therefore, the required radon gas samples can be drawn at several points, and also, if a pit is dug within the enclosed volume, it is easier to draw gas into the volume.

A second embodiment of the invention is characterized in that the radon meter is installed through a wall of the volume so that the underpressure in the volume produced by the meter causes gas flow from the soil, and said gas being recorded by the meter as it passes through the meter. As a result, an even gas flow from the soil into the volume is achieved and further, through the meter out. With the even flow-through very reliable measuring results are achieved.

An embodiment of the invention is furthermore characterized in that the lower margin of the tent-like volume is provided with a collar running therearound which seals the volume against the ground. On top of said collar may be placed weights if seen necessary.

An advantageous embodiment of the invention is furthermore characterized in that on the wall of the volume is placed an underpressure meter. Therefore, it is possible to make sure and monitor that the underpressure remains continuously even within the space.

An embodiment of the invention is characterized in that the volume is provided with a separate suction means with which gas is drawn into the volume, for instance via a tube.

An advantageous embodiment of the invention is characterized in that the enclosed volume is a box in which a soil sample may be placed and in which the flow caused by the radon meter circulates the gas therein through the meter. In an embodiment of this kind, a sample taken from the soil is placed in the enclosed volume in which the radon gas emerging from the sample can be recorded with the radon meter provided within said volume.

An embodiment of the invention is furthermore characterized in that in the lower part of the box is placed a soil sample container, on a shelf plane above which the radon meter is placed. A blower in the radon meter generates a gas flow in the box, whereby the gas emerging from the sample circulates as a uniform gas flow through the meter.

An embodiment of the invention is furthermore characterized in that in the upper part of the box there is a window through which the reading displayed by the radon meter can be read.

The invention is described in the following with the aid of examples, referring to the drawings attached in which FIG. 1 presents a given area in which measurings are carried out at five different points.

FIG. 2 presents the measuring means of an embodiment in oblique top view.

Figure 5:
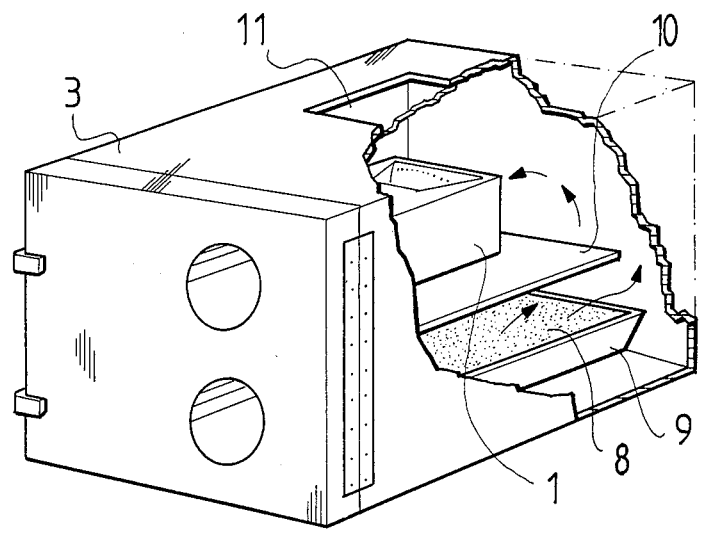

FIG. 5 presents the measuring means of another embodiment.

Figure 1:
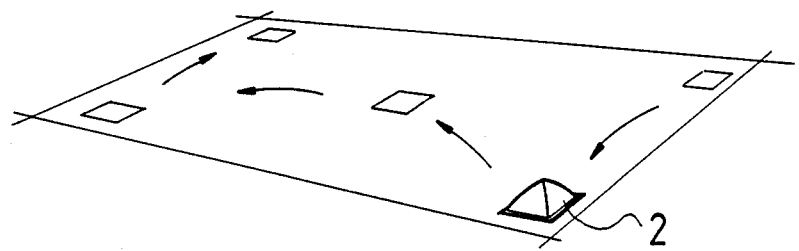
Figure 2:
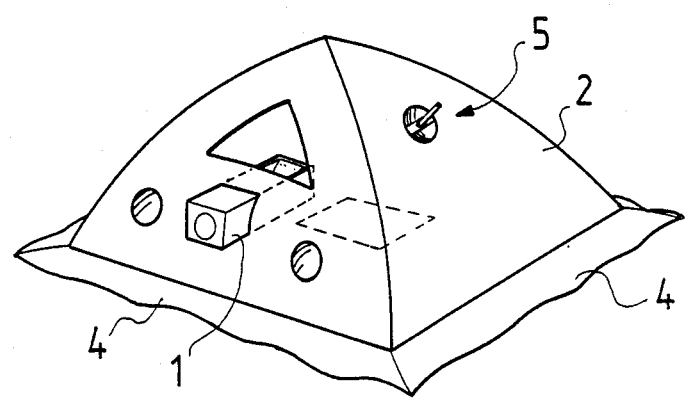
Figure 3:
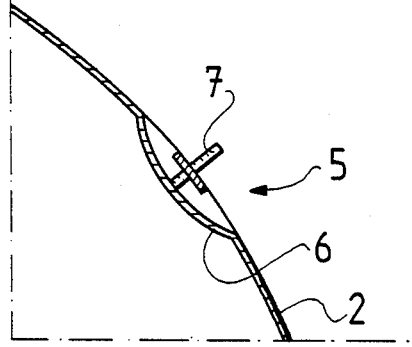
FIG. 3 shows in cross-section the underpressure meter of FIG. 2.
Figure 4:
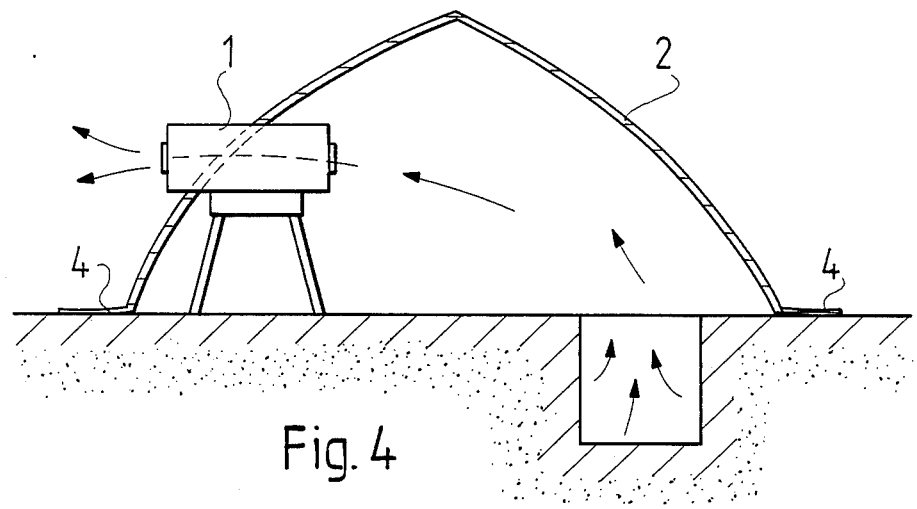
FIG. 4 shows in cross-section the measuring means of FIG. 2.
Figure 6:
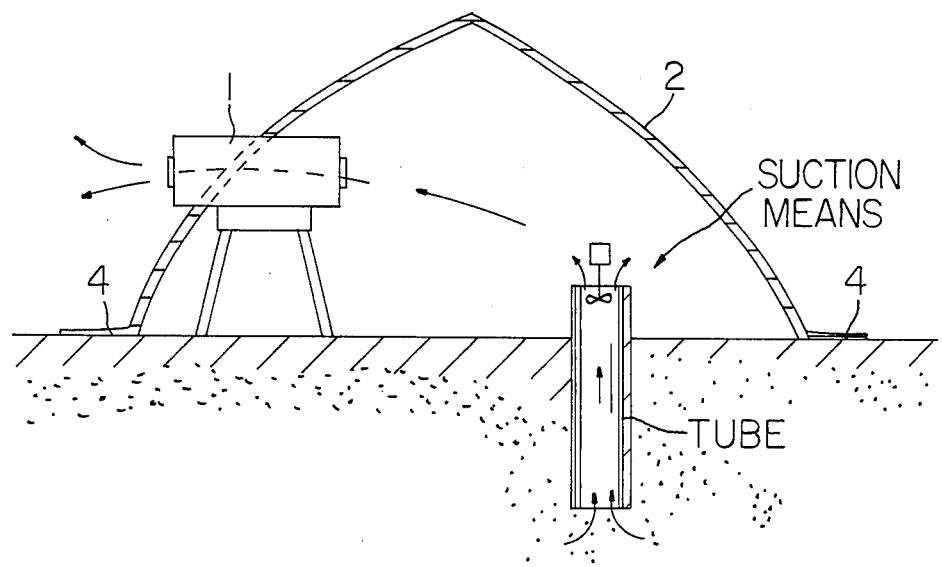

FIG. 6 is a similar showing as FIG. 4 but with the addition of a suction means and tube placed into the ground.

The measuring means for radon gas in the soil consists of a radon meter 1 comprising a blower which causes the flow-through of the gas within the meter. The measuring means comprises an enclosed volume 2, 3, the gas located in which is measured with the radon meter. In FIGS. 1-4, the enclosed volume 2 consists of a tent-like cupola to be moved about on a site, as e.g. in FIG. 1, to several points, on which a house is going to be built. The radon meter 1 is installed through a wall of the volume 2 so that the underpressure caused by the meter in the volume causes a gas flow from the soil in the manner indicated by arrows depicted in FIG. 4. The lower margins of the tent-like volume 2 are provided with a collar 4 running therearound, which seals the volume against the ground. If needed, weights such as stones or gravel may be placed on the collar. On the wall of the volume 2 there is an underpressure meter 5. As underpressure is produced in the volume 2, the thin rubber diaphragm 6 is withdrawn inwards and the underpressure may be read on the measuring stick 7.

In the embodiment as shown in FIG. 5, the enclosed volume is a box 3 in which soil sample 8 may be placed. The flow caused by the radon meter 1 circulates the gas therein through the meter. In the lower part of the box is placed a soil sample container 9, the radon meter 1 being located on a shelf 10 thereabove. In the upper part of the box 3 is placed a window 11 wherethrough the readings displayed by the radon meter may be read.

In the embodiment shown in FIG. 6, there is a suction means mounted in a tube which extends into the soil wherein the gas from the soil is drawn into the volume underneath the tent 2.

What is claimed is:

1. A means for measuring radon gas in soil comprising:

wall means sealingly mounted adjacent its periphery upon the soil to define an enclosed gas filled volume;

a continuous acting radon meter means for measuring amounts of radon;

said radon meter means being installed through said wall means;

said radon meter means having a blower means which extracts a flow gas from said soil enclosed gas filled volume and thence through said radon meter means to an area, outside of said wall and said enclosed gas filled volume, and wherein said continuous-acting radon meter continuously measures the amount of radon in said soil by measuring the radon extracted in the gas therefrom which gas passes through said continuously-acting radon meter.

2. Measuring means according to claim 1, wherein the enclosed wall comprises a tent-like cupola intended to be transferred on the ground to several points in which for instance a house is going to be built.

3. Measuring means according to claim 1, wherein the enclosed gas filled volume is reduced due to an underpressure generated in the gas filled volume by the blower means of the continuous acting radon meter that causes a gas flow from the soil.

4. Measuring means according to claim 1, wherein a lower margin of the wall means defining the gas filled volume is provided with a collar means running therearound for sealing the volume against the ground.

5. Measuring means according to claim 1, wherein on the wall means there is an underpressure meter.

6. Measuring means according to claim 1, wherein a separate suction means is placed in the gas filled volume, with which gas is drawn from the soil via a tube into the volume.

7. Measuring means according to claim 1, wherein the continuous-acting meter means is enclosed in a box means in which a soil sample can be placed and in which the flow caused by the blower means of the continuous radon meter means circulates the gas therethrough to the meter.

8. Measuring means according to claim 7, wherein in a lower part of the box means is palced a soil sample container, and wherein the continuous acting radon meter means being located on a shelf thereabove.

9. Measuring means according to claim 8, wherein in an upper part of the box means is placed a window where readings displayed by the continuous acting radon meter means may be read.

10. Measuring means according to claim 7, wherein in an upper part of the box means is placed a window where readings displayed by the continuous acting radon meter means may be read.

11. Measuring means according to claim 1 wherein there are more than one metering means with blower means installed through said wall means.

* * * * *